United States Defensive Publication [19] (H) [11] T100,503

Taylor et al. [43] Apr. 7, 1981

[54] LIQUID EMULSIFIER FOR BREAD

[76] Inventors: Marcia A. Taylor, 164 Walton Ct., Kingsport, Tenn. 37663; Gerald D. Neu, Rte. 8, 4313 Beechcliff Dr., Kingsport, Tenn. 37664

[21] Appl. No.: 139,064

[22] Filed: Apr. 10, 1980

Related U.S. Application Data

[63] Continuation of Ser. No. 930,286, Aug. 2, 1978, abandoned.

[51] Int. Cl.[3] ..... A21D 2/14; A23D 5/00

[52] U.S. Cl. ..... 426/549; 426/612; 426/653; 426/654

[57] ABSTRACT

Liquid emulsifiers for bread are prepared by blending diacetyl tartaric acid esters of unsaturated vegetable oil or animal fat, monoglycerides, unsaturated vegetable oil, and propylene glycol monoester of unsaturated vegetable oil or animal fat. Bread prepared from these emulsifiers exhibit excellent physical characteristics.

9 Claims, No Sheets Drawing,

13 Pages Specification

The file of this unexamined application may be inspected and copies thereof may be purchased (849 O.G. 1221, Apr. 9, 1968).